Oct. 1, 1940.　　　C. J. KELLER　　　2,216,201

METHOD OF MAKING TUBULAR INSERTS

Filed Dec. 22, 1934

INVENTOR
Clarence J. Keller
BY
Spencer Hardman & Fehr
his ATTORNEYS

Patented Oct. 1, 1940

2,216,201

UNITED STATES PATENT OFFICE 2,216,201

METHOD OF MAKING TUBULAR INSERTS

Clarence J. Keller, Anderson, Ind., assignor to General Motors Corporation, Detroit, Mich., a corporation of Delaware Application December 22, 1934, Serial No. 758,750

6 Claims. (Cl. 29—155.55)

This invention relates to the manufacture of distributor cap inserts and more particularly to a novel method of manufacturing such inserts.

It is among the objects of the present invention to sever slugs from intermittently fed bar stock and to form the slugs into shells by a cold heading and a following extruding operation.

It is another object of the present invention to face the open end of a shell.

It is another object of the present invention to form an external bead on a shell.

It is another object of the present invention externally and longitudinally to knurl a shell.

Further objects and advantages of the present invention will be apparent from the following description, reference being had to the accompanying drawing wherein a preferred embodiment of the present invention is clearly shown.

In the drawing:

Fig. 1 discloses the severing of a slug from bar stock.

Figure 1:
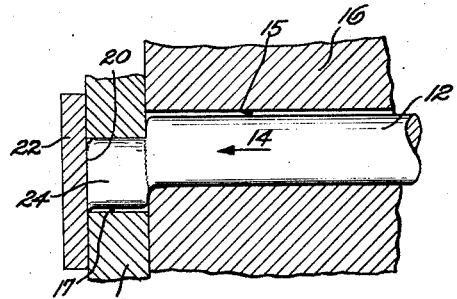

The consecutive figures in the drawing illustrate progressive steps in the novel method of manufacturing distributor cap inserts 10. With reference to Fig. 1, preferably cylindrical bar stock 12 of good conductive material, such as copper, is fed in the direction of arrow 14 in Fig. 1 by any suitable means such as for instance two continuously or intermittently rotated feed rollers (not shown) which yieldingly engage the bar stock. The bar stock is fed through an aperture 15 of a stationary shear member 16 and into the aligned aperture 17 of a movable shear member 18 until the forward end 20 of the bar stock engages a stationary stop 22, whereupon further feeding of the bar stock is prevented. The movable shear member 18 is thereafter moved in any suitable manner relative to the stationary shear member 16 whereby a slug 24 is severed from the bar stock.

This slug 24 is then inserted in any suitable manner into a die 26, preferably by the movable shear member 18 which may bring the slug into alignment with the aperture 28 of the die, whereupon an axially movable ram 30 pushes said slug from the movable shear member 18 into the aligned aperture 28. The movable shear member 18 is then returned into alignment with the stationary shear member 16 whereupon the bar stock 12 is again fed into engagement with the stop 22.

Figure 2:
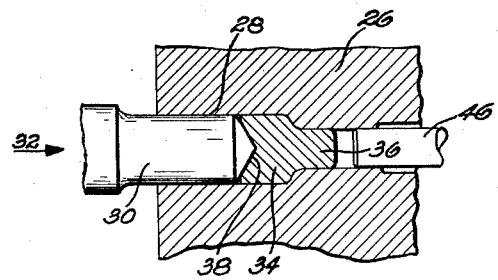
Fig. 2 illustrates a cold heading operation performed on a slug.

As previously explained, the ram 30, while advancing in the direction of arrow 32 in Fig. 2, pushes the slug 24 from the movable shear member 18 into the aligned aperture 28 of die 26, and upon continued movement in that direction the ram cold-heads the slug into the shape shown in Fig. 2. It will be noticed that the cold-headed slug has a cylindrical portion 34 of substantially the same diameter as the original slug, a reduced stem 36 in axial alignment with the cylindrical portion and a dish-shaped end surface 38.

Figure 3:
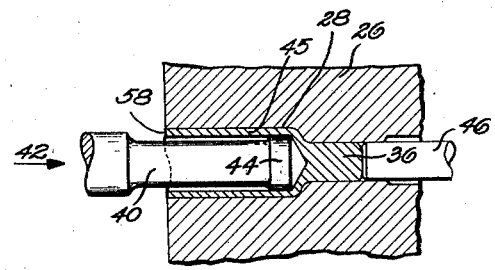
Fig. 3 illustrates the extruding of a cold headed slug into shell form.
Figure 7:
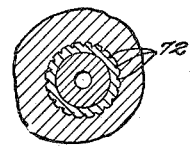
Fig. 7 is a fragmentary section taken on the line 7—7 of Fig. 6.
Figure 4:
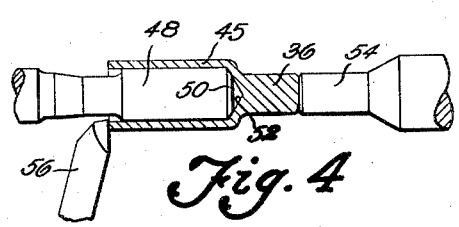
Fig. 4 illustrates a facing operation performed on a shell.

While the cold-headed slug remains in the same die 26, a reciprocable extruding tool 40 is moved in any suitable manner in the direction of arrow 42 in Fig. 3 into the position shown therein, whereby the cylindrical portion 34 of the cold-headed slug is extruded into the shape of a shell 45 as shown in Fig. 3. During movement of the extruding tool 40 in the direction of arrow 42, the metal of the cold-headed slug is caused to flow between the head 44 of said tool and the aperture 28 of the die 26 until the tool reaches the end position shown in Fig. 3.

As will be noticed from Figs. 2 and 3, it is preferable to extrude the stem 36 to its full length in two operations, primarily to prevent the cold heading ram 30 from exerting too great an axial pressure against the slug during the cold-heading operation. Therefore, the ram 30 causes the partial formation of the stem and the extruding tool 40 elongates said stem to its proper length by forcing the metal not only between the tool head 44 and the die aperture 28 but also toward the stem. In this manner the pressures exerted by the ram 30 and the extruding tool 40, respectively, are approximately the same and the wear and tear on these tools is, therefore, substantially equal. A knock-out pin 46 projects into the die 26 and in its inoperative position determines the length of the stem 36 as can be readily understood. The knock-out pin 46 may be reciprocated in any conceivable manner so as to remove the shell 45 from the die 26 after the retraction of the extruding tool 40 therefrom. Likewise the extruding tool 40 may be reciprocated in any suitable manner.

After the shell 45 has been thus obtained, it is received by a rotatable stub shaft 48, having a frusto-conical end portion 50 which engages the cone shaped internal bottom 52 of the shell. A rotatable thrust member 54 engages the stem 36 of the shell and clamps the cone shaped internal bottom 52 thereof into driving engagement with the frusto-conical shaft end 50. Either the stub shaft 48 or the thrust member 54 may be driven, and either the stub shaft 48 or the thrust member 54 may be reciprocable. A facing tool 56 is approached in any suitable manner to the thus clamped and rotating shell 45 and more particularly to the jagged end surface 58 thereof in order to face the same.

Figure 5:
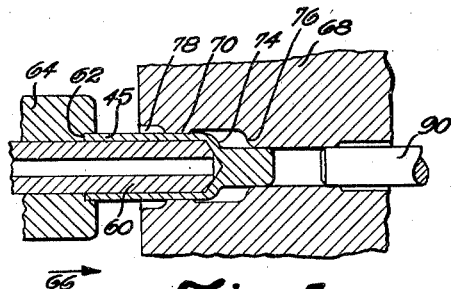
Fig. 5 illustrates a knurling operation performed on a faced shell.
Figure 6:
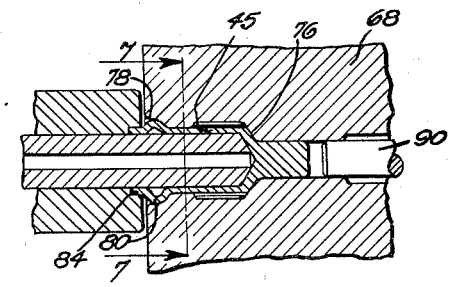
Fig. 6 illustrates a beading operation performed on a knurled shell.
Figure 8:
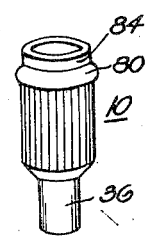
Fig. 8 is a perspective view of a finished insert.

After removal of the shell 45 from the stub shaft 48, it is passed over a cylindrical bar 60 and received with its open end in a recess 62 of a ram 64. Both, the bar 60 as well as the ram 64 are reciprocable, however, the ram 64 must be reciprocable independently of bar 60. The faced shell 45 is passed over bar 60 while both, the ram 64 as well as the bar 60, are in a position most retracted from a die 68. Upon movement of ram 64 and bar 60 with the thereon deposited shell 45 in the direction of arrow 66 in Fig. 5, the shell is moved into the die 68, and more particularly the periphery of the shell is forced past an annular rib 70 of die 68 which is provided with longitudinal, equally spaced cutting teeth 72 for knurling the outer periphery of the shell until the shell surface 74 comes to rest against the corresponding surface 76 of the die as best shown in Fig. 6. Therefore, the shell is knurled only over part of its length as appears best from Fig. 8. The die 68 is also provided with an annular recess 78 adjoining the annular rib 70. When the shell 45 comes to rest on the die surface 76, bar 60 ceases to reciprocate but remains in the position shown in Fig. 6, whereas the ram 64 continues its movement into the position shown in Fig. 6. Such continued movement of the ram 64 relative to bar 60 causes a part of the shell wall to fold outwardly into the annular recess 78 of die 68, thereby forming an external annular bead 80. The bar 60 prevents the shell wall from collapsing inwardly wherefore the bead must be necessarily an externally raised bead as can be readily understood. It will be noticed from Fig. 8 that a cylindrical continuation 84 of the shell wall proper emerges from the annular bead 80. In order to prevent during the bead formation an outward collapse of the shell wall portion 84, the same is received by the annular recess 62 of ram 64. After a shell has thus been knurled and provided with an annular bead, ram 64 as well as bar 60 are withdrawn from die 68 and the finished insert is ejected from said die by a knock-out pin 90 which is reciprocable in any suitable manner.

While the embodiment of the present invention as herein disclosed, constitutes a preferred form, it is to be understood that other forms might be adapted, all coming within the scope of the claims which follow.

I claim:

1. In a method of manufacturing distributor cap inserts, the steps of causing relative axial movement between the cup of an insert and a knurling die to knurl the former, and stopping relative axial movement between a portion of said cup and the die while continuing such relative movement toward said cup portion between another cup portion and the die whereby the cup part between said portions is upset into an annular bead.

2. In a method of manufacturing distributor cap inserts, the steps of reenforcing the inner wall and a top portion of the outer wall of the cup of the insert against lateral collapse, causing relative axial movement between the reenforced cup and a knurling die to knurl another portion of the outer cup wall, and stopping relative axial movement between said other portion and the die while continuing such relative movement toward the cup bottom between said top portion and the die whereby the cup wall between said portions is upset into an annular bead, the relatively stationary die then reenforcing said other cup portion against outward collapse.

3. A method for producing by cold working from a billet an object having a cup-shaped portion and an integral axial extension comprising placing a billet in a die, punching the billet when it is in the die, by an axially moving punch to cause it to spread radially of the axis sufficiently to cause its transverse cross section to become that of the die, and without removing the billet from the die, punching it by an axially moving punch other than the one first used, to cause the metal thereof to flow in two opposite axial directions simultaneously and thus form a cup and an axial extension.

4. In a method of manufacturing distributor cap inserts, the steps of forming a metal slug into a cup-shaped element, supporting the cup-shaped element throughout its length on a mandrel of the size of the inner diameter of the cup, forcing the cup-shaped element while supported on said mandrel, into a cup-shaped die part of which has a diameter substantially equal to that of said element and a part of greater diameter, and applying pressure to one end of the cup-shaped element after the mandrel has completed its movement and while the said element is supported on the mandrel and held against axial movement within the die, so as to expand a part of said element into the larger part of the die while preventing inward collapsing of said element in order to form a bead on the outer surface thereof.

5. In a method of manufacturing distributor cap inserts, the steps of forming a metal slug into a cup-shaped element, supporting the cup-shaped element throughout its length on a mandrel of the size of the inner diameter of the cup, forcing the cup-shaped element while supported on said mandrel, into a knurling die part of which has a diameter substantially equal to that of said element and a part of greater diameter to knurl the outer surface of said element, and subsequently applying pressure to the open end of said element while supported on said mandrel and while held against axial movement within the die, to expand a part of said element into the larger part of the die in order to form a bead on the outer surface thereof.

6. In a method of manufacturing distributor cap inserts, the steps of forming a metal slug into a cup-shaped element, supporting the cup-shaped element throughout its length on a mandrel of the size of the inner diameter of the cup, forcing the cup-shaped element while supported on said mandrel, into a die part of which has a diameter substantially equal to that of said element and a part of greater diameter, moving a ram against the open end of the cup-shaped element after the motion of the mandrel has stopped and while the element is supported on the mandrel and held against axial movement between the mandrel and the wall of the die in order to apply pressure to the end of said element so as to expand a part thereof into the larger portion of the die for the purpose of forming a bead on the outer surface of the element and prevent collapsing of said element during the formation of the bead.

CLARENCE J. KELLER.